Jan. 8, 1963 K. L. WESTLIN 3,071,916
DUST SEPARATOR
Filed Oct. 12, 1959 4 Sheets-Sheet 1

INVENTOR.
KARL L. WESTLIN
BY
Ralph B. Brick
ATTORNEY

Jan. 8, 1963   K. L. WESTLIN   3,071,916
DUST SEPARATOR
Filed Oct. 12, 1959   4 Sheets-Sheet 3
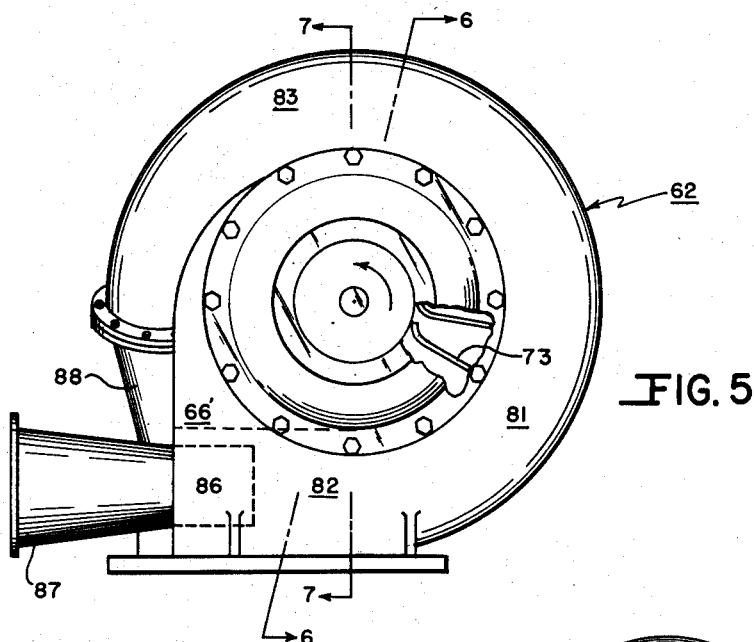
FIG. 5
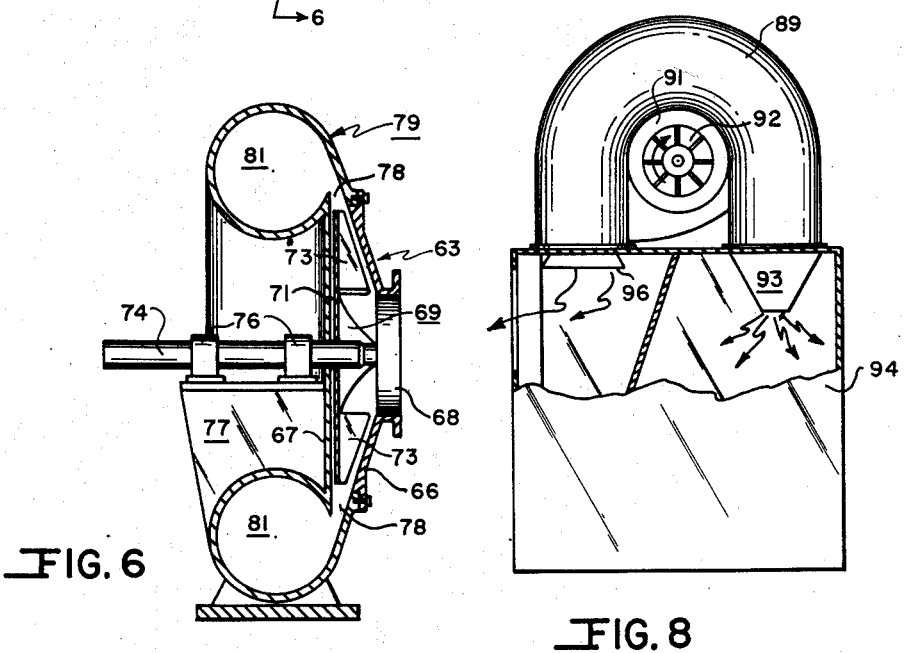
FIG. 6
FIG. 8
INVENTOR.
KARL L. WESTLIN
BY
Ralph B. Brick
ATTORNEY

INVENTOR.
KARL L. WESTLIN
BY
ATTORNEY 3,071,916
DUST SEPARATOR
Karl L. Westlin, Louisville, Ky., assignor to American Air Filter Company, Inc., Louisville, Ky., a corporation of Delaware
Filed Oct. 12, 1959, Ser. No. 845,995
15 Claims. (Cl. 55—338)

This invention relates to dust separators and more particularly to dust separators of the type wherein a dust laden gas stream is introduced into a dust concentrator so that such stream is caused to whirl as it travels axially along the dust concentrator to concentrate the dust load in the outer portion of the stream as it passes through the concentrator and to permit clean gas to be removed from the center portion thereof.

It long has been known in the gas cleaning art to move a dust laden gas stream from a blower through a system of duct work to a station wherein the gas is subjected to cyclonic dust separation. To accomplish this, structural arrangements have been required which have been expensive to construct and to maintain and which have required a considerable amount of space for their operation.

The present invention provides an improved dust separating apparatus which avoids the above-named disadvantages, incorporating the desirable features of cyclonic separation in combination with a centrifugal type fan in a straight-forward, economical, and efficient construction that requires a minimum of space and a minimum of power to operate. Further, the present invention provides a dust separating apparatus which has a high air handling capacity for its size so as to make it particularly suitable for portable and small installations.

Various other features of the present invention will become obvious to one skilled in the art upon reading the disclosure set forth hereinafter.

More particularly the present invention provides apparatus for separating dust particles from a gaseous stream comprising a fan housing, a gas inlet passage in the housing, a centrifugal fan disposed in the housing in communication with the gas inlet passage, a dust concentrator of the cyclone type contiguous to and enveloping a portion of the housing, and a gas outlet passage along the periphery of the housing communicably connecting the housing with the dust concentrator, the gas outlet passage positioned with reference to the inner face of the wall of the dust concentrator to direct a dust laden gas stream passed outward from the housing by the centrifugal fan tangentially along such inner face so that the stream is caused to whirl as it travels axially along the dust concentrator to thereby concentrate the dust load in the outer portion of the stream as it passes through the concentrator and to permit clean gas to be removed from the center portion thereof.

It is to be understood that various changes can be made in the arrangement, construction and form of the several parts of the apparatus disclosed herein without departing from the scope or spirit of the present invention.

Referring to the drawings:

FIGURE 5 is a side view of a dust separator incorporating a further embodiment of the present invention;

FIGURE 6 is a sectional view of the dust separator of FIGURE 5, taken in a plane passing through line 6—6 of FIGURE 5;

Figure 2:
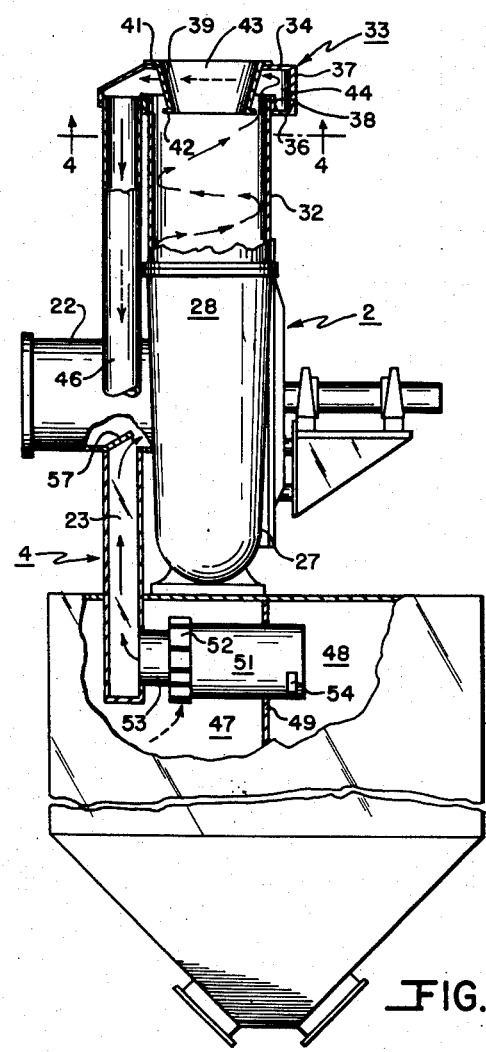
FIGURE 2 is a partially broken away side view of the dust separating assembly of FIGURE 1, further disclosing the hopper and secondary gas system which can be utilized therewith.
Figure 1:
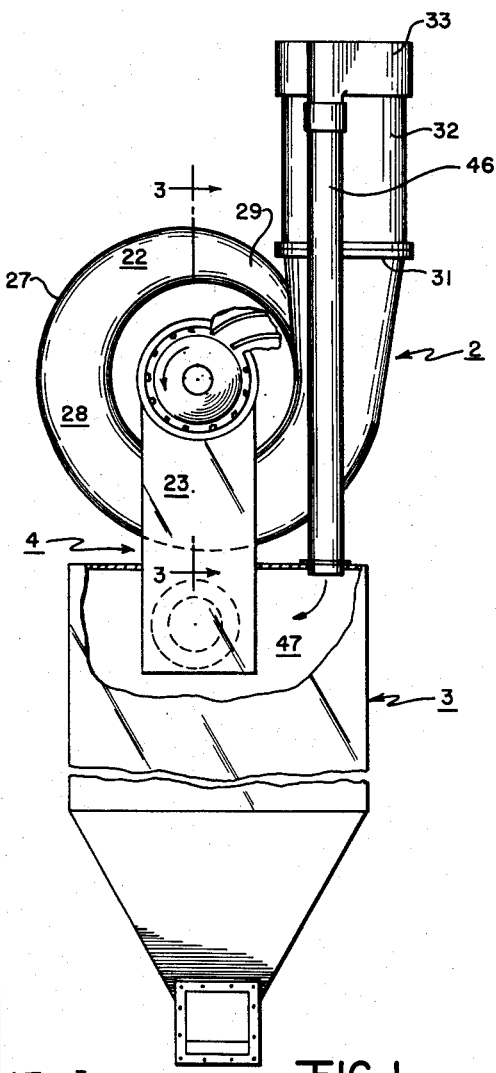
FIGURE 1 is a partially broken away end view of a dust separating assembly incorporating one embodiment of the present invention.

Referring to FIGURES 1 and 2 of the drawings, the invention is disclosed as embodied in an arrangement comprising a dust separator 2 mounted on a hopper 3 and including a secondary collection system 4 which is disposed partially in hopper 3 and which is connected to dust separator 2 to recirculate a portion of the treated gas to such dust separator.

Figure 3:
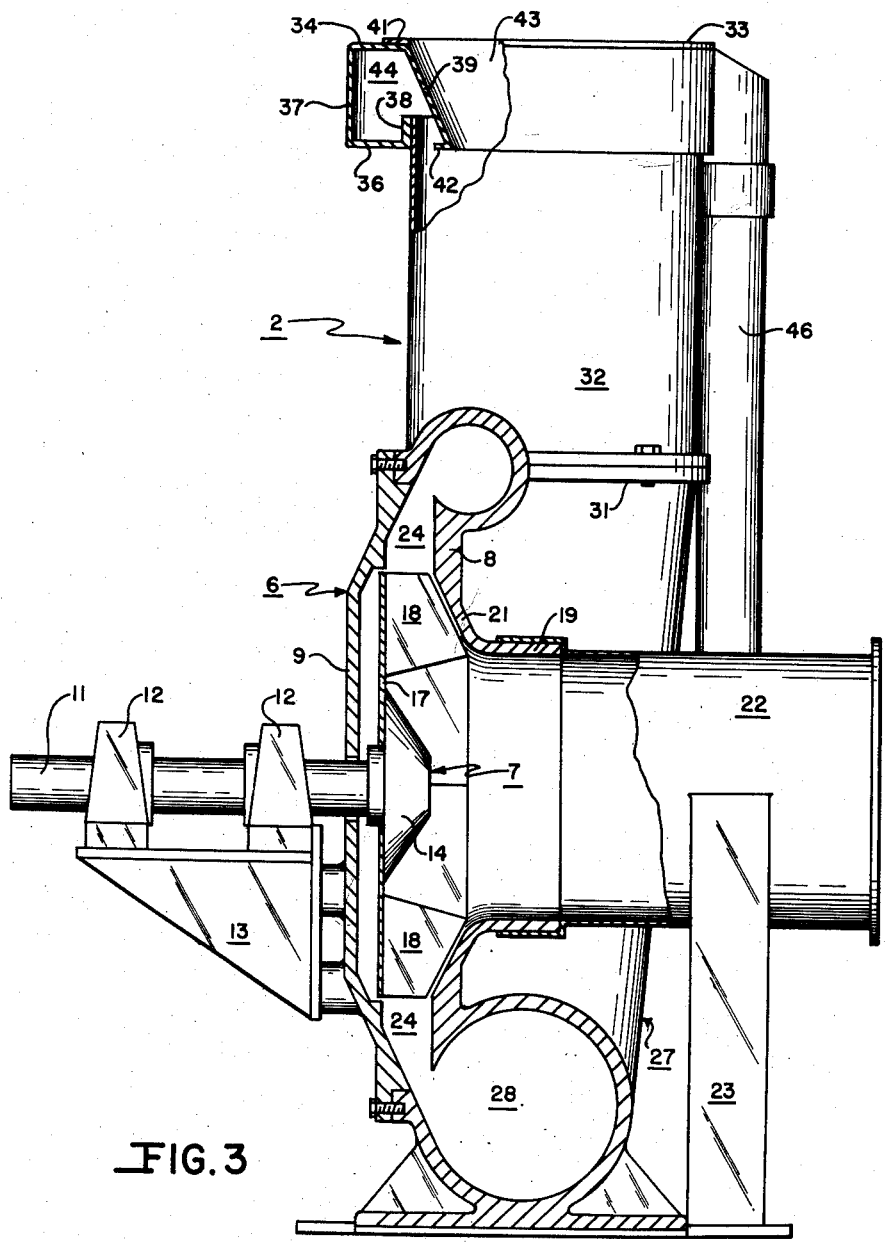
FIGURE 3 is an enlarged sectional side view of the dust separator of FIGURES 1 and 2, taken in a plane passing through line 3—3 of FIGURE 1.

As can be seen more clearly in FIGURE 3 of the drawings, dust separator 2 includes fan housing 6 having a substantially circular periphery and having disposed therein the centrifugal impeller or fan 7 between the front wall 8 and rear wall 9 of the housing. Fan 7 is fixedly secured to drive shaft 11 rotatably mounted in spaced bearing members 12 which, in turn, are supported by bearing bracket 13 fastened to rear wall 9 of housing 2. A suitable power means, such as a motor (not shown), can be connected to shaft 11 to drive fan 7; or, if so desired, a motor can be connected directly to the fan, with the motor shaft itself serving as the fan drive shaft.

Fan 7 includes an air-flow contoured hub member 14 fixedly mounted to shaft 11. An annular back plate member 17 surrounds and is secured to hub 14. Mounted along one of their corresponding edges on the face of back plate member 17 of fan 7 are a plurality of fan blades 18, these blades being spaced from each other about hub 14 and extending radially outward therefrom. Although blades 18 can be of various shapes and designs depending upon the results desired, in the embodiment disclosed in FIGURES 1-4 of the drawings, it has been found advantageous to employ blades that are curved backwardly. With such an arrangement, gas moved by the blades is substantially radially discharged from the blade tips into a passage communicating with the inlet of a dust concentrator (hereinafter described).

It is to be noted that housing 6 is provided with a cylindrical inlet ring 19 which defines a gas inlet passage through which dirty gas to be treated is introduced to fan 7. Ring 19 can be cast as one piece integrally with front wall 8 of housing 6 or, if desired, can be formed from several pieces that can be welded or bolted together and fastened to wall 8. To prevent gas leakage around blades 18 of fan 7, ring 19 includes a flanged rear portion 21 positioned in close proximity to the front edges of blades 18 to afford a minimum of clearance therebetween for the free rotation of the blades. In the embodiment of FIGURE 3, inlet ring 19 also includes a cylindrical extension member 22 which can be connected to a dirty gas source (not shown) and which has connected thereto a recirculating duct member 23. As will be seen hereinafter, duct 23 forms part of the secondary gas system 4.

Surrounding the radial tips of fan blades 18 in direct communication therewith is annular gas outlet passage 24 formed by the spaced front and rear walls 8 and 9 of housing 6. This passage 24, in turn, communicably connects with a section of dust concentrator 27 along the peripheral length thereof, the concentrator 27 being wrapped around housing 6 to envelop such housing in a 360° volute (FIGURE 1). It is to be noted that, if desired, the cross sectional area of passage 24 can be arranged to diverge depthwise toward its discharge end thereof adjacent the dust concentrator, such divergence serving to some extent as a means of gas diffusion to change the gas velocity pressure to static pressure, the depth of the passage being selected in accordance with the results desired.

As can be seen in FIGURE 1, the wall of volute-shaped dust concentrator 27 includes a first section 28 which defines a conical space, the cross-sectional area of which increases in the direction of gas flow from its closed small end 29 to its discharge end 31. As can be seen in FIGURE 3, the abovedescribed gas outlet passage 24 extends along the peripheral length of section 28 in tangential orientation to the inner face of the wall thereof to communicate therewith. Accordingly, gas radially discharged from the tips of fan blades 18 is introduced through gas outlet passage 24 tangentially into section 28 of the dust concentrator substantially along the entire length of the conical space formed by the section to thus create and maintain a vortex throughout such length.

The dust concentrator 27 described herein is similar in many respects to the dust concentrator disclosed in applicant's Patent No. 2,806,550 and, as such, it also includes a concentrating outlet end section 32 mounted at the discharge end 31 of section 28. The outlet end section 32 provides a cylindrical continuation of gas flow space, proceeding axially from the discharge end 31 of section 28. As in aforementioned Patent No. 2,806,550, section 32 is in the form of a true cylinder of uniform cross-sectional area, section 32 functioning to accommodate the axially flowing vortex of gas created in section 28 and to give gas borne dust particles additional time to concentrate in the outer portion of the gas stream. The length of section 32 advantageously should neither be too small nor be too large if optimum operating conditions are to be achieved.

Figure 4:
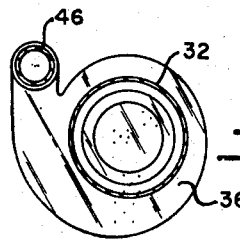
FIGURE 4 is a sectional view of the outlet portion of the separator of FIGURES 1-3, taken in a plane passing through line 4—4 of FIGURE 2.

Mounted at the outer end of the concentrating outlet end section 32 is scroll member 33. Scroll member 33 serves to divide the outlet end of section 32 into an inner axially disposed clean gas outlet and an outer scroll-shaped dust passage positioned to receive the outer portion of the gas stream containing the concentrated dust. As can be seen in FIGURES 3 and 4 of the drawings, scroll member 33 includes spaced upper and lower spiral-shaped plate segments 34 and 36 respectively, connected together by an outer wall member 37. The assembly is fastened to the end of outlet section 32 through a cylindrical lip portion 38 integral with and extending at a right angle from the lower plate segment 36 to surround the outlet end section 32. A conical outlet pipe 39, having a base flange 41 fastened to upper plate segment 34, extends downwardly into the end of outlet end section 32, the conical pipe terminating at its small end in an outwardly directed deflector plate 42. Conical pipe 39 provides an inner axially disposed clean gas outlet 43 and forms with spaced annular plate segments 34 and 36 and connecting outer wall 37 scroll-shaped dust passage 44. This dust passage 44, as will be seen more clearly hereinafter, serves to receive from outlet section 32 the outer portion of the gas stream containing the concentrated dust or, in other words, the dirty gas stream. In operation, the scroll-shape of passage 44 affords a flow area passage which is proportionate to the amount of dirty gas introduced therein to insure a constant velocity of gas flow therethrough.

Connected to scroll-shaped dust passage 44 is one end of a secondary duct 46 which forms part of the secondary collector system 4. The other end of duct 46 communicates with primary chamber 47, one of two separate chambers 47 and 48 formed in hopper 3 by partition 49 (FIGURE 2). Positioned in primary chamber 47 and communicating with chamber 48 is a tubular centrifugal or cyclone separator 51. Separator 51 can be any one of several types of known separators and advantageously can be similar to the one disclosed in applicant's Patent No. 2,762,450. As disclosed herein, separator 51 includes tangential gas inlet 52 disposed in chamber 47 to communicate with secondary duct 46. The separator is further provided with an axial clean gas outlet 53 which communicates with one end of recirculating duct 23. The other end of recirculating duct 23 communicates with cylindrical extension member 22 which, in turn, communicates with the gas inlet of the centrifugal fan 7. The dust flow end of separator 51 contains a peripheral dust discharge orifice 54 and communicates with the other chamber 48 of hopper 3. It is to be noted in FIGURE 1 of the drawings that recirculating duct 23 connects with cylindrical extension 22 along approximately 180° of the periphery of the extension in order to permit as wide a secondary return as possible, thus minimizing gas flow resistance in the secondary system. In this connection, it is to be understood that it is possible to arrange the juncture of duct 23 with cylinder 22 along 360° of the periphery of cylinder 22 if so desired. As will be noted in FIGURE 2 of the drawings, a baffle member 57 is provided where recirculating duct 23 connects with cylinder 22, the baffle serving to insure an aspirating effect on the return gas by dirty gas introduced into the primary system through extension cylinder 22.

In a typical operation of the apparatus disclosed in FIGURES 1-4 of the drawings, dirty gas enters into the primary system of the apparatus through cylindrical extension member 22, the dirty gas serving to aspirate gas from the recirculating duct 23 to be carried along in an axial direction with such dirty gas to the housing 6 of centrifugal fan 7. The dirty gas is turned through a right angle and enters the spaces between blades 18 of fan 7 which has been caused to revolve in a direction toward outlet 43 of volute 27, the gas being circulated radially outward by revolving fan 7 to pass through gas outlet passage 24. It is to be noted that during the period in which the gas flows through the fan blades 18, energy is expanded upon the gas to cause it to move toward the outer periphery or tips of the blades. Because blades 18 of fan 7 in FIGURES 1-4 are of the backwardly curved type, the gas is radially discharged from the tips of the blade into passage 24, entering tangentially into conical section 28 of dust concentrator 27 from passage 24. As aforementioned, dust concentrator 27 is similar to the concentrator disclosed in applicant's Patent No. 2,806,550 and, when the gas enters tangentially into section 28, a vortex is created which subjects the gas borne dust particles to intensive centrifugation. As a result of this action, the dust particles tend to, and most of them do, concentrate in the outer portion of the gas flow along the wall of section 28 as they move toward outlet end section 32. Section 32 serves to give some of the remaining dust particles enough time to concentrate in the outer portion before they reach scroll member 33. Upon reaching the scroll member, the centrally disposed clean gas passes through clean gas outlet 43 while the outer portion of the gas stream containing concentrated dust particles, passes through the scroll-shaped dust passage 44, secondary duct 46 and into the primary chamber 47 of hopper 3. The heavier particles of dust then gravity settle into the bottom of hopper 3 for subsequent discharge and the gas with lighter dust particles still entrained therein is passed through gas inlet 52 of cyclone separator 51 where additional dust particles are passed off into the secondary chamber 48 of hopper 3 through dust discharge 54. The clean gas passes through centrally disposed gas outlet 53, recirculating duct 23 and into cylindrical extension member 22, where it is aspirated with additional dirty gas drawn through such inlet by fan 7 to the primary system for treatment.

Figure 7:
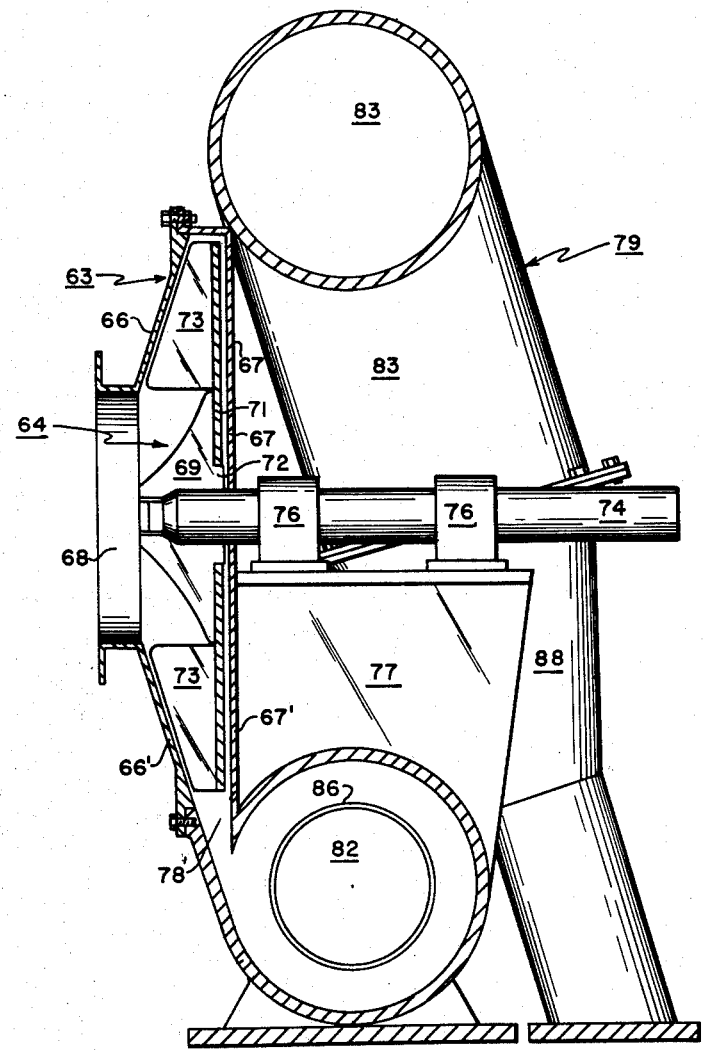
FIGURE 7 is an enlarged sectional view of the dust separator of FIGURE 5 taken in a plane passing through line 7—7 of FIGURE 5 and looking in a direction opposite to the direction of the sectional view of FIGURE 6. and, FIGURE 8 is a side view of a dust separator incorporating still another embodiment of the present invention.

Referring to FIGURES 5-7, a modified embodiment of applicant's invention is disclosed. This modified embodiment includes a dust separator broadly designated by the reference numeral 62. A housing 63 of dust separator 62 has disposed therein in close proximity therewith, a centrifugal fan or impeller 64 rotatably positioned between front wall 66 and rear wall 67 of the housing. The front and rear walls can be made of several separate plates bolted or welded together or, if desired, can be cast as one integral piece. A gas inlet passage 68 is provided in front wall 66 to permit dirty gas to be passed axially into housing 63 for treatment. Centrifugal fan 64 disposed within housing 63 includes air flow contoured hub 69 and annular back plate member 71 mounted to the hub. Mounted along one of their corresponding edges to the face of back plate member 71 of fan 64 are a plurality of fan blades 73. Blades 73 are spaced circumferentially about hub 69, extending radially outward therefrom. Like blades 18 of the dust separator of FIGURES 1–4, blades 73 can be of various shapes and designs, depending upon the results desired. In the embodiment of FIGURES 5–7, it has been found advantageous to employ fan blades which are either of the radial or forward curved type to insure a substantial tangential component of force on the gas as it passes from the tips of the blades so as to thereby direct the gas toward the dust discharge end of the concentrator (hereinafter described). In order to rotate fan 64, hub 69 is fixedly mounted to drive shaft 74. Shaft 74 is supported in spaced bearing blocks 76 which are carried by bearing bracket 77 integral with housing 63. A suitable power source (not shown) can be attached to the free end of shaft 74 to drive the same.

Surrounding 180° of fan 64 in direct communication with the radial tips of blades 73 is a gas outlet passage 78 (FIGURE 6) formed by the spaced front and rear walls 66 and 67 of housing 63. This gas outlet passage 78, in turn, communicably connects to a 180° horseshoe-shaped section 81 of dust concentrator 79 along the peripheral length thereof, the dust concentrator 79, including the section 81, being wrapped around housing 63 to envelop such housing in a substantially 360° volute (FIGURE 5). It is to be noted that gas outlet passage 78 which communicates with section 81 of concentrator 79 extends along the peripheral length of section 81 to open tangentially to the inner face of the wall thereof (FIGURE 6).

The dust concentrator 79 further includes a clean gas outlet end straight section 82 which proceeds axially from one end of the 180° horseshoe-shaped section 81 and a dust outlet end elbow-shaped section 83 which proceeds axially from the other end of the horseshoe-shaped section 81 (FIGURE 5). The sections of the concentrator are so positioned that the longitudinal axis of the clean gas outlet end section 82 falls in a common vertical plane with the longitudinal axis of section 81, whereas the longitudinal axis of dust outlet end section 83 falls in a plane offset to that vertical plane which determines the axis of sections 81 and 82. With such an arrangement, clean gas outlet end section 82 communicably connects with fan 64 through gas outlet passage 78' formed by spaced wall segments 66' and 67'. Passage 78' surrounds the remaining 180° of fan 64 that is not surrounded by passage 78, the wall segments 66' and 67' being extensions of front and rear walls 66 and 67 respectively of housing 63. It is to be noted that passage 78' communicates with its section 82 like passage 78 communicates with section 81, extending along the peripheral length of section 82 and opening tangentially to the inner face of the wall thereof. It also is to be noted that, since elbow section 83 is offset from section 81, as aforedescribed, it does not communicate directly with fan 64 as do sections 81 and 82 of concentrator 79.

The walls of the aforedescribed connected sections 81, 82 and 83 of dust concentrator 79 define a cylindrical space which remains substantially uniform in cross-section throughout. Projecting into the outlet end of clean gas outlet section 82 of the concentrator 79 is a clean gas discharge member 86, the member 86 having an outwardly diverging conical end portion 87. And, fastened to the outlet end of dust outlet section 83 of concentrator 79 is a dust discharge conical end member 88, the apex portion of which communicably connects to a dust hopper (not shown).

In a typical operation of the apparatus disclosed in FIGURES 5–7, dirty gas passes into housing 63 in an axial direction through the gas inlet 68. The dirty gas is turned through a right angle and enters the spaces between blades 73 of fan 64 which has been caused to revolve in a direction toward the dust outlet section 83 and the dust discharge member 88 connected thereto. Since blades 73 are of a radial or forward curved type, a tangential component of force is exerted on the gas to direct it toward the dust outlet section 83 of the concentrator, the gas leaving the tips of the blades to pass through passage 78 and 78' and entering tangentially into the cylindrical space formed by sections 81 and 82 of dust concentrator 79. Since the gas enters concentrator 79 tangentially, a cyclonic action is established and the dust particles in the gas concentrate along the wall of the concentrator 79, flowing toward section 83 because of the tangential component of force exerted on the gas by the radial or forward curved blades 73 of fan 64. As the dust passes into a hopper through the dust discharge 88, the clean gas, in accordance with the cyclonic action of concentrator 79, passes out through the centrally disposed clean gas outlet member 86.

It is to be understood that the present invention is not limited to the embodiments above described. For example, it is possible to arrange the dust concentrator about the housing of a fan in a number of ways as the occasion might warrant. FIGURE 8 teaches one such modification, the concentrator 89 of cyclone type as above described being arranged in 180° horseshoe-shaped fashion around a housing 91 of an impeller 92. In the disclosed embodiment, the communicating passage formed by the housing 91 extends along the peripheral length of the concentrator 89, permitting gas to be passed from the impeller 92 tangentially to the inner surface of the concentrator wall. The end 93 of the concentrator serves as a dust discharge whereby the separated dust particles are passed into hopper 94 and the end 96 of the concentrator serves as a clean gas discharge.

The invention claimed is:

1. Apparatus for separating dust particles from a gaseous stream comprising a fan housing, a gas inlet opening in said housing, a centrifugal fan disposed in said housing in communication with said gas inlet opening, a dust concentrator of the cyclone type contiguous to and enveloping a portion of said housing, said dust concentrator including a clean gas outlet means and a dust outlet means, and a gas outlet passage radially disposed with respect to said centrifugal fan to extend longitudinally in arcuate slot-like form between the periphery of said housing and of said dust concentrator communicably connecting said housing with said dust concentrator, said passage positioned with reference to the inner face of the wall of said dust concentrator to direct a dust laden gas stream passed outward from said housing by said centrifugal fan tangentially along such inner face so that such stream is caused to whirl as it travels axially along said dust concentrator to concentrate the dust load in the outer portion of the stream as it passes through said concentrator for removal through said dust outlet means of said concentrator and to permit clean gas to be removed from the center portion thereof through said clean gas outlet means of said concentrator.

2. Apparatus for separating dust particles from a gaseous stream comprising a fan housing having a circular periphery and including spaced front and rear walls, a gas inlet opening in the front wall of said housing, a centrifugal fan disposed in said housing in communication with said gas inlet opening, a dust concentrator of the cyclone type contiguous to and enveloping a portion of said housing said dust concentrator including a clean gas outlet means and a dust outlet means, and a gas outlet passage radially disposed with respect to said centrifugal fan to extend longitudinally in arcuate slot-like form between the periphery of said housing and of said dust concentrator communicably connecting said housing with said dust concentrator, said passage communicating with said dust concentrator along the peripheral length thereof and positioned with reference to the inner face of the wall of said concentrator to direct a dust laden gas stream passed outward from said housing by said centrifugal fan tangentially along such inner face so that such stream is caused to whirl as it travels axially along said dust concentrator to concentrate the dust load in the outer portion of the stream as it passes through said concentrator for removal through said dust outlet means of said concentrator and permit clean gas to be removed from the center portion thereof through said clean gas outlet means of said concentrator.

3. Apparatus for separating dust particles from a gaseous stream comprising a fan housing, a gas inlet opening in said housing, a centrifugal fan disposed in said housing in communication with said gas inlet opening, a dust concentrator of the cyclone type contiguous to and enveloping at least 180° of said housing, said dust concentrator including a clean gas outlet means and a dust outlet means, and a gas outlet passage radially disposed with respect to said centrifugal fan to extend longitudinally in arcuate slot-like form between the periphery of said housing and of said dust concentrator communicably connecting said housing with said dust concentrator, said passage communicating with said dust concentrator along the peripheral length thereof and positioned with reference to the inner face of the wall of said dust concentrator to direct a dust laden gas stream passed outward from said fan housing by said centrifugal fan tangentially along such inner face so that such stream is caused to whirl as it travels axially along said dust concentrator to concentrate the dust load in the outer portion of the stream as it passes through said concentrator for removal through said dust outlet means of said concentrator and to permit clean gas to be removed from the center portion thereof through said clean gas outlet means of said concentrator.

4. The apparatus of claim 3, said dust concentrator enveloping substantially 270° of said fan housing.

5. The apparatus of claim 3, said dust concentrator substantially surrounding said fan housing.

6. Apparatus for separating dust particles from a gaseous stream comprising a fan housing, a gas inlet opening in said housing, a centrifugal fan disposed in said housing in communication with said gas inlet opening, a dust concentrator of the cyclone type contiguous to and enveloping a portion of said housing, a gas outlet passage radially disposed with respect to said centrifugal fan to extend longitudinally in arcuate slot-like form between the periphery of said housing and of said dust concentrator communicably connecting said housing with said dust concentrator, said passage communicating with said dust concentrator along the peripheral length thereof and positioned with reference to the inner face of the wall of said dust concentrator to direct a dust laden gas stream passed outward from said housing by said centrifugal fan tangentially along such inner face so that such stream is caused to whirl as it travels axially along said dust concentrator to thereby concentrate the dust load in the outer portion of the stream as it passes through said concentrator and to permit clean gas to be removed from the center portion thereof, a first outlet means at one end of said dust concentrator for said dust load and a second outlet means at the opposite end of said dust concentrator for said clean gas.

7. The apparatus of claim 6, the main body portion of said dust concentrator being of substantially cylindrical shape.

8. The apparatus of claim 6, said centrifugal fan including fan blades of a contour to insure a substantial tangential component of force in the discharge of the gas stream moved thereby.

9. The apparatus of claim 8, said fan blades having a forwardly curved contour.

10. Apparatus for separating dust particles from a gaseous stream comprising a fan housing, a gas inlet opening in said housing, a centrifugal fan disposed in said housing in communication with said gas inlet opening, a dust concentrator of the cyclone type contiguous to and enveloping a portion of said housing, a gas outlet passage radially disposed with respect to said centrifugal fan to extend longitudinally in arcuate slot-like form between the periphery of said housing and of said dust concentrator communicably connecting said housing with said dust concentrator, said passage communicating with said dust concentrator along the peripheral length thereof and positioned with reference to the inner face of the wall of said dust concentrator to direct a dust laden gas stream passed outward from said housing by said centrifugal fan tangentially along such inner face so that such stream is caused to whirl as it travels axially along said dust concentrator to thereby concentrate the dust load in the outer portion of the stream as it passes through said concentrator and to permit clean gas to be removed from the center portion thereof, a first outlet means at one end of said dust concentrator for said dust load, and a second outlet means at the same end of said dust concentrator for said clean gas.

11. The apparatus of claim 10, the cross-section of said dust concentrator tapering divergently toward said outlet means.

12. The apparatus of claim 10, and gas recirculation means connecting said first outlet means of said dust concentrator with said gas inlet means of said fan housing, said recirculation means including a dust concentrator and separator.

13. The apparatus of claim 10, said first outlet means of said dust concentrator including a scroll-shaped passage of increasing cross-section toward its outlet end.

14. The apparatus of claim 10, said centrifugal fan including blades of a contour to insure a substantial radial discharge of the gas stream moved thereby.

15. The apparatus of claim 14, said fan blades having a backwardly curved contour.

References Cited in the file of this patent

UNITED STATES PATENTS

| | | |
|---|---|---|
| 516,371 | Gale | Mar. 13, 1894 |
| 566,001 | Marshall | Aug. 18, 1896 |
| 771,691 | Allington | Oct. 4, 1904 |
| 1,517,457 | Reed | Dec. 2, 1924 |
| 1,691,536 | Winslow et al. | Nov. 13, 1928 |
| 1,720,863 | Stebbins | July 16, 1929 |
| 1,941,449 | Sylvan | Jan. 2, 1934 |
| 2,247,528 | Sylvan | July 1, 1941 |
| 2,738,855 | Fallon et al. | Mar. 20, 1956 |
| 2,762,450 | Westlin | Sept. 11, 1956 |
| 2,806,550 | Westlin | Sept. 17, 1957 |
| 2,897,917 | Hunter | Aug. 4, 1959 |

FOREIGN PATENTS

| | | |
|---|---|---|
| 505,996 | Great Britain | May 19, 1939 |
| 1,061,355 | France | Nov. 25, 1953 |